(12) United States Patent
Roberts et al.

(10) Patent No.: US 9,324,072 B1
(45) Date of Patent: Apr. 26, 2016

(54) BIT-FLIPPING MEMORY CONTROLLER TO PREVENT SRAM DATA REMANENCE

(75) Inventors: David A. Roberts, Meridian, ID (US); Russell B. Lloyd, Middleton, ID (US); Joshua J. Nekl, Kuna, ID (US)

(73) Assignee: IXYS Intl Limited (KY)

( * ) Notice: Subject to any disclaimer, the term of this patent is extended or adjusted under 35 U.S.C. 154(b) by 2378 days.

(21) Appl. No.: 12/229,574

(22) Filed: Aug. 22, 2008

(51) Int. Cl.
*G06F 7/04* (2006.01)
*G06Q 20/34* (2012.01)

(52) U.S. Cl.
CPC ................... *G06Q 20/3576* (2013.01)

(58) Field of Classification Search
CPC .................................................. G06Q 20/3576
USPC ............................................................ 726/26
See application file for complete search history.

(56) References Cited

U.S. PATENT DOCUMENTS

| | | | |
|---|---|---|---|
| 2001/0052062 A1* | 12/2001 | Lipovski | G11C 7/065 712/32 |
| 2003/0139296 A1* | 7/2003 | Lee | A01N 43/78 504/239 |
| 2010/0223453 A1* | 9/2010 | Walmsley | B41J 2/04505 713/2 |

OTHER PUBLICATIONS

U.S. Appl. No. 11/139,418, filed May 28, 2005, Chock et al.
Gutmann, Peter: "Data Remanence in Semiconductor Devices", IBM T.J. Watson Research Center, Proceedings of the 10th USENIX Security Symposium, Washington, D.C., USA, Aug. 13, 2001. p. 10.

* cited by examiner

*Primary Examiner* — Charles C Agwumezie
(74) *Attorney, Agent, or Firm* — Imperium Patent Works; T. Lester Wallace; Darien K. Wallace

(57) ABSTRACT

A memory is organized into blocks. In a bit-flipping operation, a memory block is read, the read bit data values are inverted, and the inverted data is written back to the memory block. Inverted memory blocks are tracked by setting a flag bit in the memory block, or by storing a pointer to a memory block. In a read operation, a memory block is read and, if the tracking method indicates the memory block is inverted, the read data values are reverted before being returned. In a write operation, a memory block is read and, if the tracking method indicates the memory block is inverted, the write data values are inverted before being written. Inversion of data values and tracking of inverted memory blocks may be performed by a specialized memory controller or by a processor executing secure memory code. Data remanence is thus prevented in the memory.

22 Claims, 10 Drawing Sheets

FIRST AND SECOND
EMBODIMENTS

DETAIL OF MEMORY CONTROLLER

INVERSION FLAG BIT
24

23

| 0 | 1 | 1 | 1 | 1 | 1 | 1 | 1 |
|---|---|---|---|---|---|---|---|
| 0 | 0 | 0 | 0 | 0 | 0 | 0 | 0 |
| 1 | 1 | 1 | 1 | 1 | 1 | 1 | 1 |
| 0 | 0 | 0 | 0 | 0 | 0 | 0 | 0 |

32-BIT MEMORY BLOCK
WITH INVERSION FLAG BIT
NOT SET

FIG. 5

INVERSION FLAG BIT
24

23

| 1 | 0 | 0 | 0 | 0 | 0 | 0 | 0 |
|---|---|---|---|---|---|---|---|
| 1 | 1 | 1 | 1 | 1 | 1 | 1 | 1 |
| 0 | 0 | 0 | 0 | 0 | 0 | 0 | 0 |
| 1 | 1 | 1 | 1 | 1 | 1 | 1 | 1 |

SAME 32-BIT MEMORY BLOCK,
AFTER INVERSION CYCLE, WITH
INVERSION FLAG BIT SET

FIG. 6

|   |   |   |   |   |   |   |   |
|---|---|---|---|---|---|---|---|
| 1 | 1 | 1 | 1 | 0 | 0 | 0 | 0 |
| 0 | 0 | 0 | 0 | 1 | 1 | 1 | 1 |
| 1 | 1 | 1 | 1 | 0 | 0 | 0 | 0 |
| 0 | 0 | 0 | 0 | 1 | 1 | 1 | 1 |
| 1 | 1 | 1 | 1 | 0 | 0 | 0 | 0 |
| 0 | 0 | 0 | 0 | 1 | 1 | 1 | 1 |
| 1 | 1 | 1 | 1 | 0 | 0 | 0 | 0 |
| 0 | 0 | 0 | 0 | 1 | 1 | 1 | 1 |
| 1 | 1 | 1 | 1 | 0 | 0 | 0 | 0 |
| 0 | 0 | 0 | 0 | 1 | 1 | 1 | 1 |
| 1 | 1 | 1 | 1 | 0 | 0 | 0 | 0 |
| 0 | 0 | 0 | 0 | 1 | 1 | 1 | 1 |
| 0 | 0 | 0 | 0 | 1 | 1 | 1 | 1 |
| 1 | 1 | 1 | 1 | 0 | 0 | 0 | 0 |
| 0 | 0 | 0 | 0 | 1 | 1 | 1 | 1 |
| 1 | 1 | 1 | 1 | 0 | 0 | 0 | 0 |
| 0 | 0 | 0 | 0 | 1 | 1 | 1 | 1 |
| 1 | 1 | 1 | 1 | 0 | 0 | 0 | 0 |
| 0 | 0 | 0 | 0 | 1 | 1 | 1 | 1 |
| 1 | 1 | 1 | 1 | 0 | 0 | 0 | 0 |

BLOCK 1 — 110
BLOCK 2 — 112
BLOCK 3 — 114
BLOCK 4 — 116
BLOCK 5 — 118

MEMORY CONTROL LOGIC USES POINTER TO MOST RECENTLY INVERTED MEMORY BLOCK

33 → BLOCK 3

5 BLOCKS OF SECURE MEMORY IN SECOND EMBODIMENT USING POINTER TO TRACK BIT INVERSION

FIG. 7

WRITE OPERATION USING FLAG BIT

WRITE OPERATION USING POINTER

READ OPERATION USING POINTER

BIT-FLIPPING MEMORY CONTROLLER TO PREVENT SRAM DATA REMANENCE

TECHNICAL FIELD

The described embodiments relate to secure memories and to anti-tamper techniques.

BACKGROUND INFORMATION

Within secure electronic devices, memories often store sensitive data such as bank account numbers and credit card numbers, associated PIN numbers, and encryption keys that make attractive targets for sophisticated thieves. Manufacturers of such secure electronic devices therefore often include security features that prevent thieves who wish to obtain stored sensitive data from tampering with memories. FIG. 1 (Prior Art) is a simplified diagram of one such secure electronic device that is commercially available from Zilog, Inc. of San Jose, Calif. If tamper control logic 1 detects a tamper condition, then the tamper control logic 1 sends a bulk write signal via conductor 2 to a secure memory 3 thereby causing sensitive information stored in secure memory 3 to be erased before the thief can read the sensitive information out of the memory. Such memories, however, may exhibit what is sometimes referred to as data "remanence". It has been recognized that when a static random access memory (SRAM) is maintained with the same value stored in a bit cell for a long period of time, and the bit cell is then erased (such as due to a tamper detect condition), that when power is restored to the SRAM the bit cell tends to return to the last programmed state of the cell or otherwise to exhibit the last programmed state of the cell. This tendency to retain residual data is a potential way for a thief to obtain sensitive information from a secure electronic device. A thief may, for example, retrieve a discarded electronic device that was used to store sensitive data. The thief may then power up the discarded electronic device, and inspect the memory or otherwise analyze the memory to learn information that was previously stored in memory.

To address this remanence problem, software executing on the processor of a secure device may be made to periodical write to the secure memory to flip the value of each bit in a process referred to as "bit-flipping". A variable or amount of information such as an encryption key is periodically inverted, and then written back to the secure memory to overwrite the locations that stored the previous version of the variable or amount of information. By this mechanism, the amount of time the bits that store the variable or amount of information is equal to the amount of time that the bits store the inverse of the variable or amount of information.

SUMMARY

A secure memory is organized into blocks. In a novel bit-flipping operation, data stored in a memory block is read out of the secure memory, the data values are inverted, and the inverted data values are written back into the memory block. At some later time, inverted data stored in a memory block is read out of the memory, the data values are reverted, and the reverted data values are written back into the memory block. Bit-flipping and reversion operations are performed periodically such that each bit cell of each memory block spends roughly as much time storing inverted data as it does storing non-inverted data.

Whether a memory block contains inverted data is tracked. In one example, an inversion flag bit stored within the memory block identifies an inverted memory block. In another example, a stored inversion flag pointer references the memory address of the memory block which has most recently undergone an inversion or reversion operation. Comparison of the address referenced by the inversion flag pointer with the address of a target memory block allows determination of whether the target memory block contains inverted data.

In one example of the novel secure memory controller, both a novel read request operation and a novel write request operation are supported. If the secure memory controller receives a read request, then the secure memory controller reads data from a target memory block and reverts the data before the data is supplied back to the processor if tracking indicates that the target memory block contains inverted data. If, on the other hand, tracking indicates that the target memory block contains inverted data, then data read from the target memory block is supplied to the processor without inversion.

In the novel write request operation, the secure memory controller receives a write request from the processor. If tracking indicates that the target memory block contains inverted data, then the data from the processor to be written to the memory is inverted prior to being written. On the other hand, if tracking indicates that the target memory block contains non-inverted data, then the data from the processor to be written to the memory is not inverted prior to being written. In both the novel read request operation and a novel write request operation described above, the number of bits of data to be read from or written to the secure memory can be a smaller than the number of bits in a memory block.

In one example, a novel secure memory controller performs the bit-flipping and reversion operations and tracks whether a memory block contains inverted data. In another example, execution of secure memory code causes a processor to perform bit-flipping and reversion operations on a secure memory and to track whether memory blocks of the secure memory contain inverted data.

Periodically inverting and reverting the bit cells of the memory blocks of a secure memory such that each bit cell of the memory spends as much time programmed with the inverse of its programmed value as with its true programmed value helps to prevent the secure memory from exhibiting data remanence after erasure. This helps to prevent a thief from using data remanence as a means to obtain sensitive data.

In one aspect, a general purpose memory integrated circuit includes a bit-flipping mechanism. The bit-flipping mechanism is transparent to other circuitry accessing the memory.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 5 is a diagram of one typical 32-bit memory block of the secure memory of FIG. 3. The memory block includes an inversion flag bit used by the secure memory controller for tracking whether the memory block contains inverted bit values.

FIG. 6 is a diagram of the memory block of FIG. 5 with bit values inverted. The inversion flag bit is set to a digital logic one value, which indicates to secure memory controller that the memory block contains inverted bit values.

FIG. 7 is a diagram of a series of 32-bit memory blocks, each storing identical information, in accordance with a second novel aspect. The first memory block, the second memory block and the third memory block contain bits with inverted values. The secure memory controller maintains an inversion flag pointer that is used to track whether a memory block contains bits with inverted values.

DETAILED DESCRIPTION

Reference will now be made in detail to background examples and some embodiments of the invention, examples of which are illustrated in the accompanying drawings.

Figure 1:
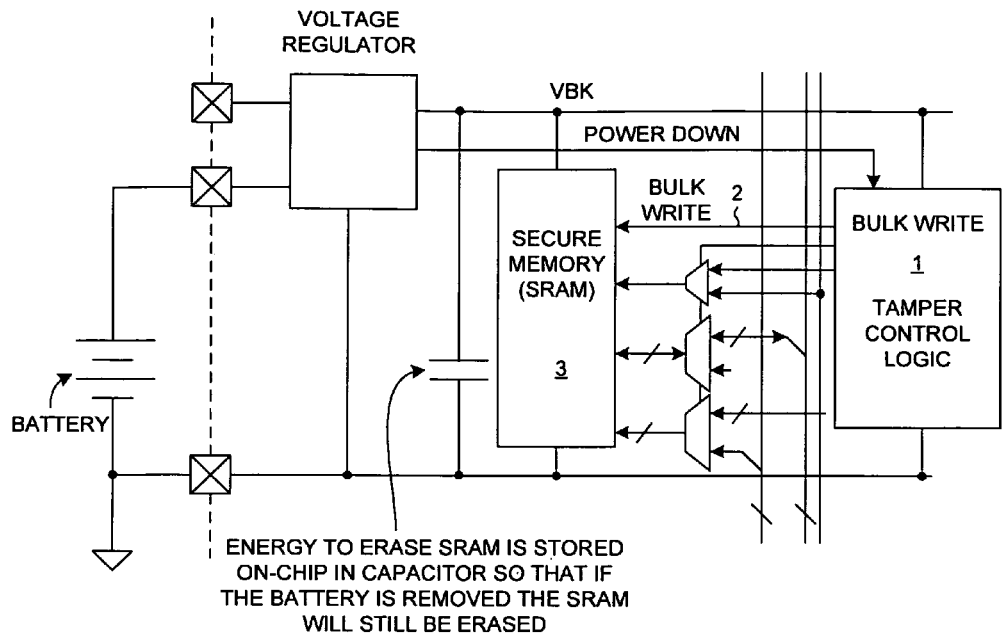
FIG. 1 (Prior Art) is a simplified block diagram of a secure electronic device.
Figure 2:
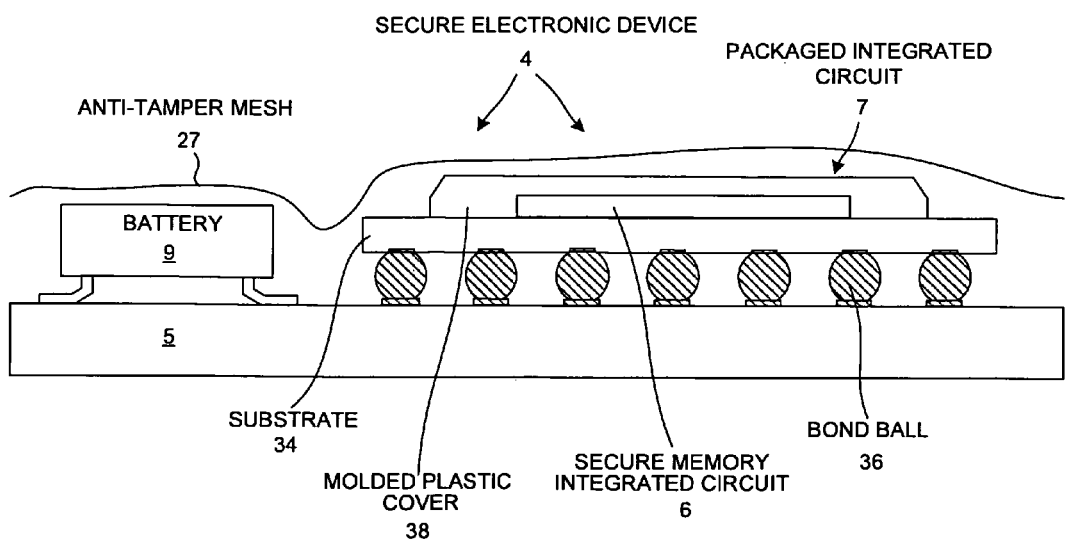
FIG. 2 is a simplified cross-sectional diagram of a printed circuit board assembly portion of a secure electronic device in accordance with one novel aspect.

FIG. 2 is a simplified cross-sectional diagram of a printed circuit board assembly portion of a secure electronic device 4 in accordance with one novel aspect. A secure memory integrated circuit 6 is packaged in a ball grid array (BGA) integrated circuit package. The integrated circuit package 7 includes a substrate 34, an array of bond balls 36, and a molded plastic cap 38. The packaged integrated circuit 7 is mounted to a printed circuit board 5 as pictured. A battery 9 is also mounted to printed circuit board 5 as pictured. An anti-tamper security mesh 27 substantially covers and surrounds the packaged integrated circuit 7 and battery 9 as pictured. For further details on exemplary secure electronic device 4, see: U.S. Pat. No. 7,343,496, issued to Hsiang et al. (the subject matter of which is incorporated herein by reference).

Figure 3:
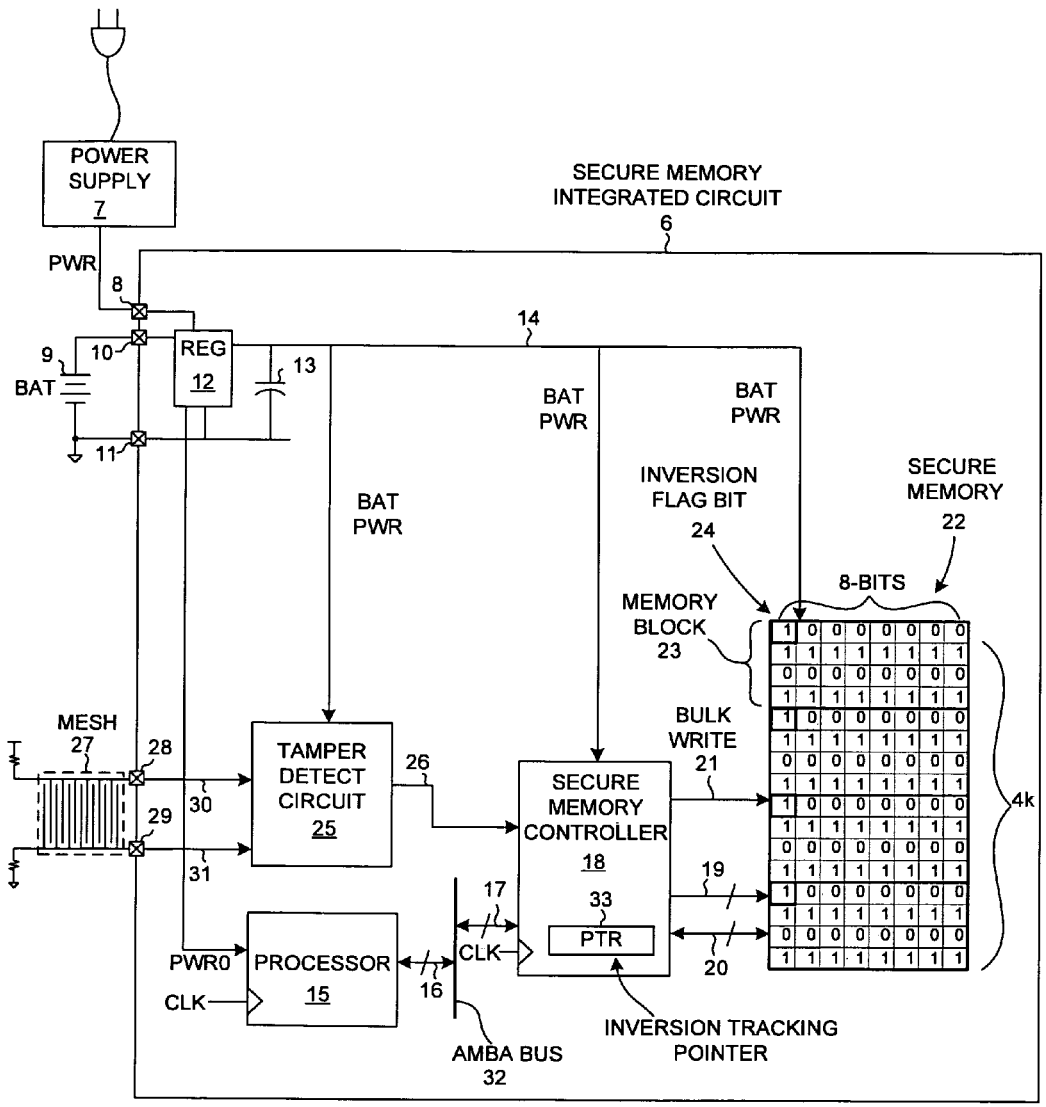
FIG. 3 is a block diagram of first and second embodiments of the secure memory integrated circuit of FIG. 2.

FIG. 3 is a more detailed diagram of secure memory integrated circuit 6 of FIG. 2. Secure memory integrated circuit 6 includes a voltage regulator 12, a capacitor 13, a processor 15, a tamper detect circuit 25, a novel secure memory 22 containing secure memory blocks 23, a novel secure memory controller 18, and a bus 32.

Processor 15, in this example, is an ARM9 processor as specified by ARM Limited, of Cambridge, England. Bus 32 is, in this example, an Advanced High-Performance Bus (AHB) bus as defined in the "Advanced Microcontroller Bus Architecture (AMBA) Specification", published by ARM Limited, Cambridge, England. Line 16 represents data conductors through which processor 15 can transmit and receive data from the AMBA bus 32. Line 17 represents data conductors through which data can be transmitted between the AMBA bus 32 and secure memory controller 18. Secure memory controller 18 interfaces to secure memory 22 via address conductors 19 and data conductors 20. Secure memory 22, in this example, is a 4k×8-bits SRAM memory. Secure memory 22 includes a plurality of memory blocks. Each memory block in this example includes four 8-bit words. Memory block 23 in FIG. 3 is an example of one of these memory blocks.

In one novel aspect, secure memory controller 18 performs bit-flipping operations on each memory block of secure memory 22. During a bit-flipping operation, secure memory controller 18 periodically reads the data values stored in a memory block 23, inverts the data values, and writes the inverted values back to the memory block 23, so that the amount of time each bit stores a digital one value and the amount of time the bit stores a digital zero value are maintained to be approximately equal. Secure memory controller 18 keeps track of whether a memory block contains inverted data values or true programmed data values. Details of the bit-flipping, reversion and tracking processes are described below.

Secure memory 22 has a bulk write mode. Tamper detect circuit 25 places secure memory 22 into the bulk write mode by signaling across the bulk write signal conductor 26. The bulk write causes the entire secure memory 22 to be written with, for example, digital zeros. The secure electronic device 4 includes a mesh of fine wires 27. The mesh 27 is coupled to tamper detect circuit 25 via terminals 28 and 29 and conductors 30 and 31. Voltage is maintained across the mesh of wires such that an attempt to probe through the wire mesh will likely result in either the touching of two wires that are maintained at the two different voltages or the breaking of one or more of the wires. Either condition is detected as a tamper condition. Upon detection of a tamper condition, tamper control circuitry 25 places secure memory 22 into the bulk write mode, rapidly erasing sensitive data from the secure memory 22.

Power supply 7 is coupled to secure memory integrated circuit 6 via a terminal 8. The secure memory 22 and tamper detect circuit 25 are battery powered in case AC line power that powers power supply 7 is removed. Battery 8 is coupled to secure memory integrated circuit via terminals 10 and 11. Capacitor 13 stores energy. In the event battery 9 is removed, energy from capacitor 13 is used to power the tamper detect circuit 25 and to erase secure memory 22 in the bulk write mode.

Figure 4:
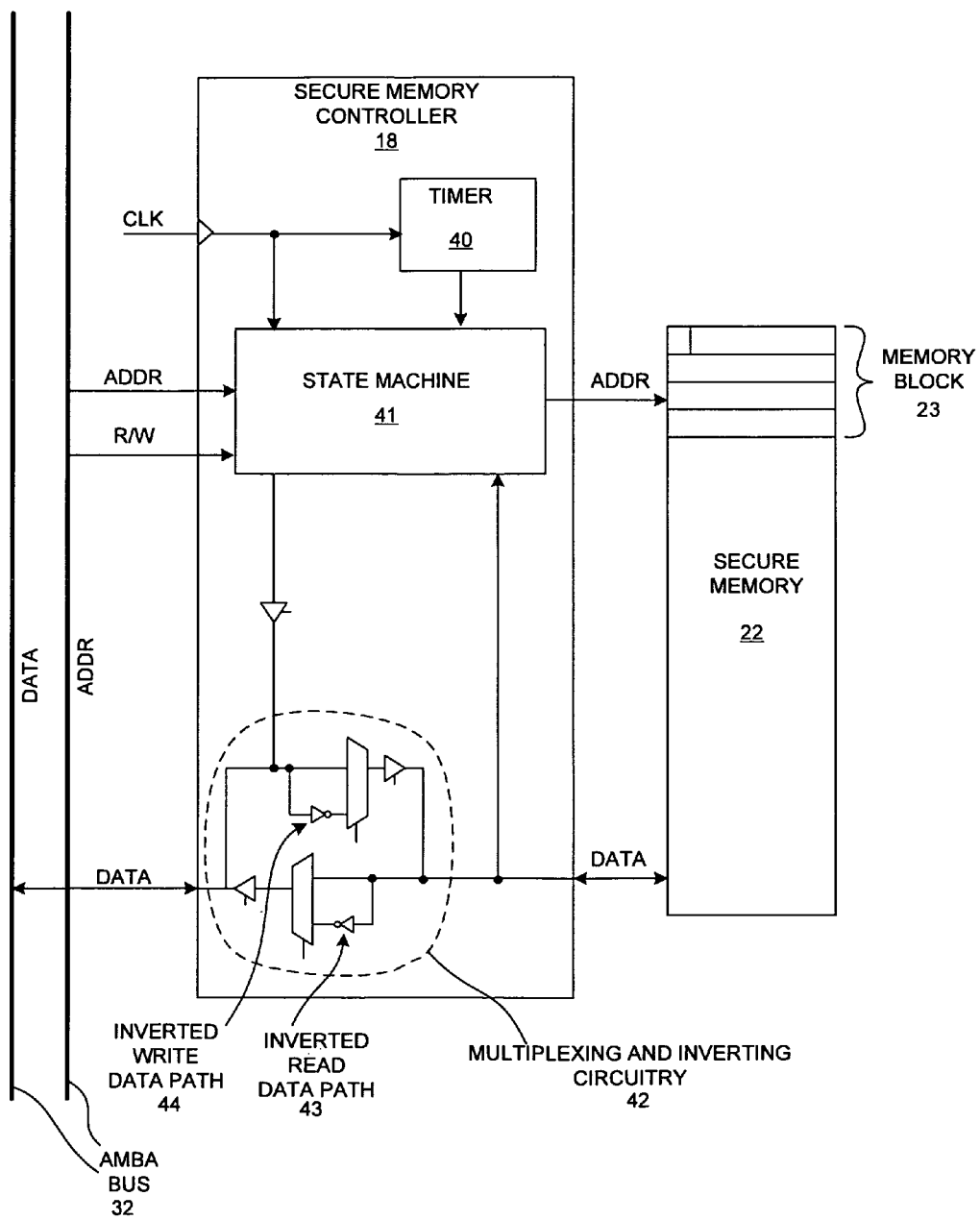
FIG. 4 is a simplified block diagram of one example of the secure memory controller of FIG. 3.

FIG. 4 is a more detailed diagram of one example of novel secure memory controller 18. Secure memory controller 18 includes a timer 40, a state machine 41, and multiplexing and inverting circuitry 42. Multiplexing and inverting circuitry includes an inverted read data path 43 and an inverted write data path 44. Secure memory controller 18 uses timer 40 to time regular bit-flipping operations. During bit-flipping operations, secure memory controller 18 causes memory blocks 23 in secure memory 22 to be inverted sequentially by address, with one microsecond between sequential inversions. When the last addressed block in secure memory 22 is reached, secure memory controller 18 begins again at the first addressed memory block 23 of secure memory 22 and causes memory blocks 23 in secure memory 22 to be reverted sequentially. Because bit-flipping operations are performed one memory block 23 at a time, secure memory controller 18 may service read and write requested from processor 15 between bit-flipping operations.

To perform a bit-flipping operation on memory block 23, secure memory controller 18 first performs a read operation on memory block 23 during which the data values stored in each bit cell of the memory block 23 are read into the state machine 41. Secure memory controller 18 then transmits the read data values to the multiplexing and inverting circuitry 42 and causes the multiplexing and inverting circuitry 42 to route the read data across the inverted write data path 44. The resulting inverted data values are then written back to the memory block 23.

If secure memory controller 18 receives a write request from processor 15, secure memory controller 18 first determines if the memory block (for example, memory block 23) containing the location addressed by the write request contains inverted bit data values. If the memory block does contain inverted data values, then secure memory controller 18 causes the write data to be routed across the inverted write data path 44 of the multiplexing and inverting circuitry 42 and then writes the now inverted write data to the memory block 23.

If secure memory controller 18 receives a read request from the processor 15, secure memory controller 18 performs a read operation on the memory block containing the addressed location of the read request. If secure memory controller 18 determines that the memory block (for example, memory block 23) contains inverted data values, then secure memory controller 18 causes the read data to be routed across the inverted read data path 43 of the multiplexing and inverting circuitry 42 before being supplied back to processor 15.

There are several ways by which secure memory controller 18 can track whether a memory block 23 contains inverted data values. A first way is described in connection with FIGS. 5 and 6. A second way is described in connection with FIG. 7.

FIG. 5 is a diagram that illustrates one 32-bit memory block 23, storing information in its true programmed, or non-inverted, state. In one novel aspect, memory block 23 includes an inversion flag bit 24. The remaining portion of the memory block stores data. The inversion flag bit 24 is storing a digital logic zero value, indicating to secure memory controller 18 that the remaining thirty-one bits of memory block 23 are to be read as having their true programmed, or non-inverted, digital logic values.

FIG. 6 is a diagram that illustrates the 32-bit memory block 23 of FIG. 5, storing the same information but with the digital logic values of the thirty-one bits inverted. Inversion flag bit 24 is storing a digital logic one value, indicating to secure memory controller 18 that the remaining thirty-one bits of memory block 23 are to be read as having inverted digital logic values.

In one example of a bit-flipping operation according to a first embodiment, secure memory controller 13 reads the thirty-one data bits and the single inversion flag bit 24 of memory block 23 such as is pictured in FIG. 5. Secure memory controller 18 inverts the digital logic values of the data bits and inversion flag bit 24 read from the memory block 23 and writes these inverted digital logic values back to memory block 23. Following the write, data bits of the memory block 23 that stored digital logic zeroes now contain digital logic ones; data bits of the memory block 23 that stored digital logic ones now contain digital logic zeroes. Inversion flag bit 24, which contained a digital logic zero, now contains a digital logic one. Prior to the bit-flipping operation, the contents of memory block 23 are as illustrated in FIG. 5. After the bit-flipping operation, the contents of memory block 23 are as illustrated in FIG. 6.

Variations on the above-described process may be made. For example, the series of inversion and reversion operations may be performed on the memory blocks in other than a first-to-last order.

Because the data values in each memory block 23 are regularly inverted and reverted at regular intervals as determined by timer 40, the amount of time each bit of the secure memory 22 stores a digital logic zero is substantially equal to the amount of time each bit of the secure memory stores a digital logic one. If the secure memory 22 is properly erased and power to the secure memory 22 is removed, and then power to secure memory 22 is restored, the cells of secure memory 22 will not tend to return to the last programmed state of the cells after power is returned. The security of the memory 22 is enhanced because the tendency of the memory 22 to retain residual data is countered.

FIG. 7 is a diagram that illustrates a second embodiment in which a pointer is used to track whether a memory block contains bits with inverted values. Five 32-bit memory blocks are pictured, each storing identical data. Memory blocks 110, 112 and 114 store inverted digital logic values. Memory blocks 116 and 118 store true programmed, non-inverted digital logic values. Secure memory controller 18 stores a pointer to the memory block it has most recently inverted.

In an example of a bit-flipping operation according to the second embodiment, secure memory controller 18 has previously performed bit-flipping operations on memory blocks 110 and 112. Secure memory controller 18 next reads the thirty-two data bits of memory block 114 such as is pictured in FIG. 5. Secure memory controller 18 inverts the digital logic values of the read data bits using inverted write data path 44 and writes the resulting inverted digital logic values back to memory block 114. Following the write, data bits of memory block 114 that stored digital logic zeroes now contain digital logic ones; data bits of the memory block that stored digital logic ones now contain digital logic zeroes. Secure memory controller 18 then updates an inversion flag pointer 33 so that the pointer now references the memory location of memory block 114. Memory block 116 will next undergo an inversion operation, followed by memory block 118.

Secure memory controller can thus determine that any memory block with an address lower than or equal to the address referenced by the inversion flag pointer 33 contains inverted digital logic values. Any memory block with an address higher than the address referenced by the inversion flag pointer 33 contains true programmed, non-inverted digital logic values.

After the last memory block in secure memory 22 undergoes a bit-flipping operation, secure memory controller 18 starts over at the first memory block 110 and begins performing a series of reversion operations, reverting the digital logic bit values of each memory block to their true programmed, non-inverted values and again updating the pointer. Secure memory controller 18 uses the pointer to determine whether an addressed memory block contains true of inverted values.

Variations on the above-described process may be made. For example, the inversion flag pointer 33 may reference a memory block other than the most recently inverted or reverted memory block.

Figure 8:
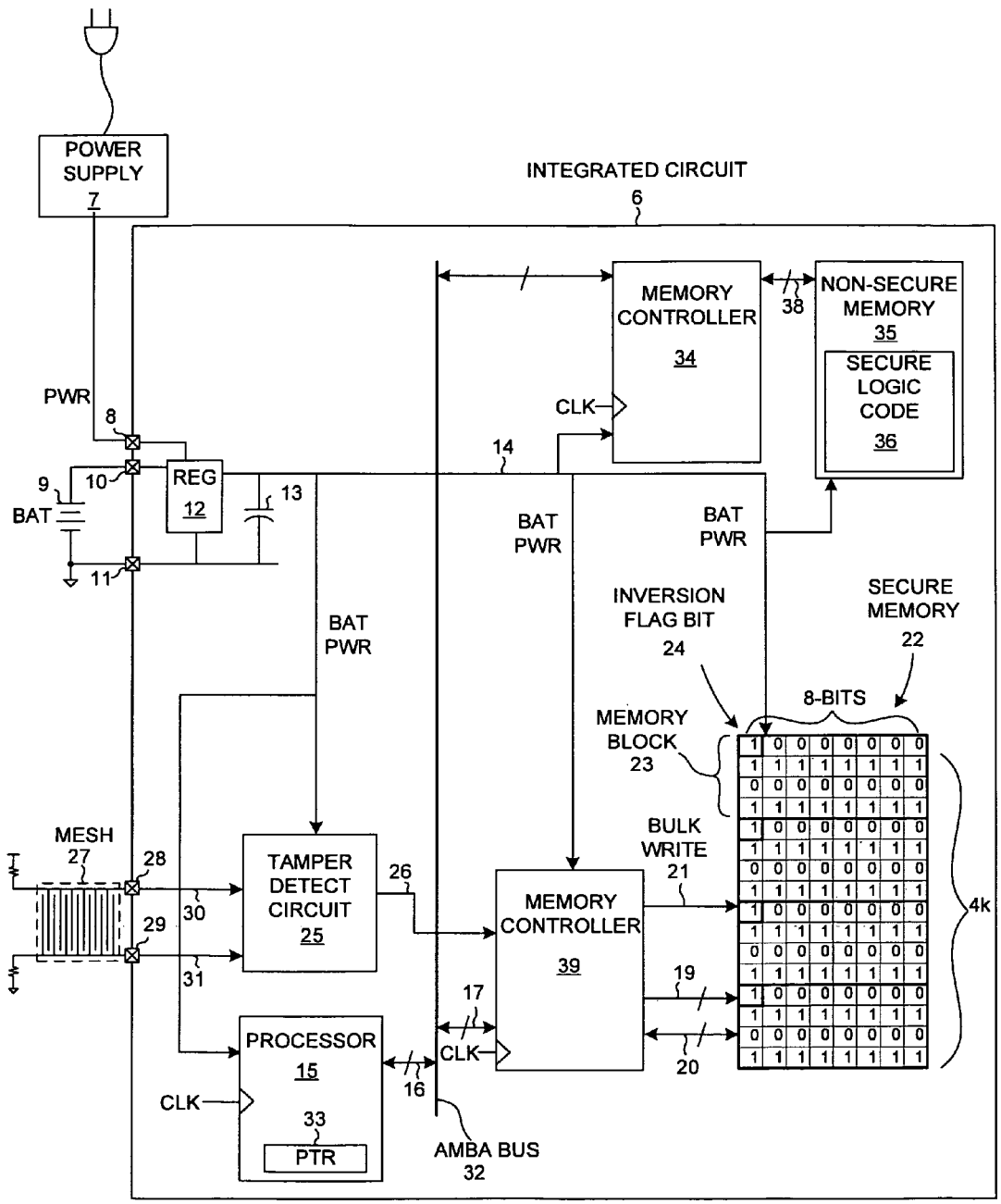
FIG. 8 is a simplified block diagram of a third embodiment of a secure memory integrated circuit.

FIG. 8 is a simplified block diagram of a secure memory integrated circuit 6 in accordance with a third embodiment of the present invention. FIG. 8 illustrates the integrated circuit of FIG. 3, with the addition of a second, non-secure memory 35 and second, non-secure memory controller 34. Second, non-secure memory controller 34 communicates with processor 15 via AMBA bus 32 and with second, non-secure memory 35 via conductors 38. Second, non-secure memory 35 stores secure memory code 36. When processor 15 executes secure memory code 36, processor 15 performs inversion and reversion operations and tracks which blocks contain inverted data and which block contain true data.

Accordingly, a non specialized memory controller 39 may be used in place of the specialized secure memory controller 18 of FIG. 3.

Secure memory code 36 causes processor 15 to periodically invert and revert the digital logic values and inversion flag bit 24 of each memory block 23 of the secure memory 22, as described above according to the first embodiment. Alternatively, secure memory code 36 may cause processor 15 to periodically invert and revert the digital logic values of each memory block 23 of the secure memory 22 and to update an inversion flag pointer 33, as described above according to the second embodiment. Accordingly, inversion flag pointer 33 is maintained by processor rather than by secure memory controller 18.

Figure 9:
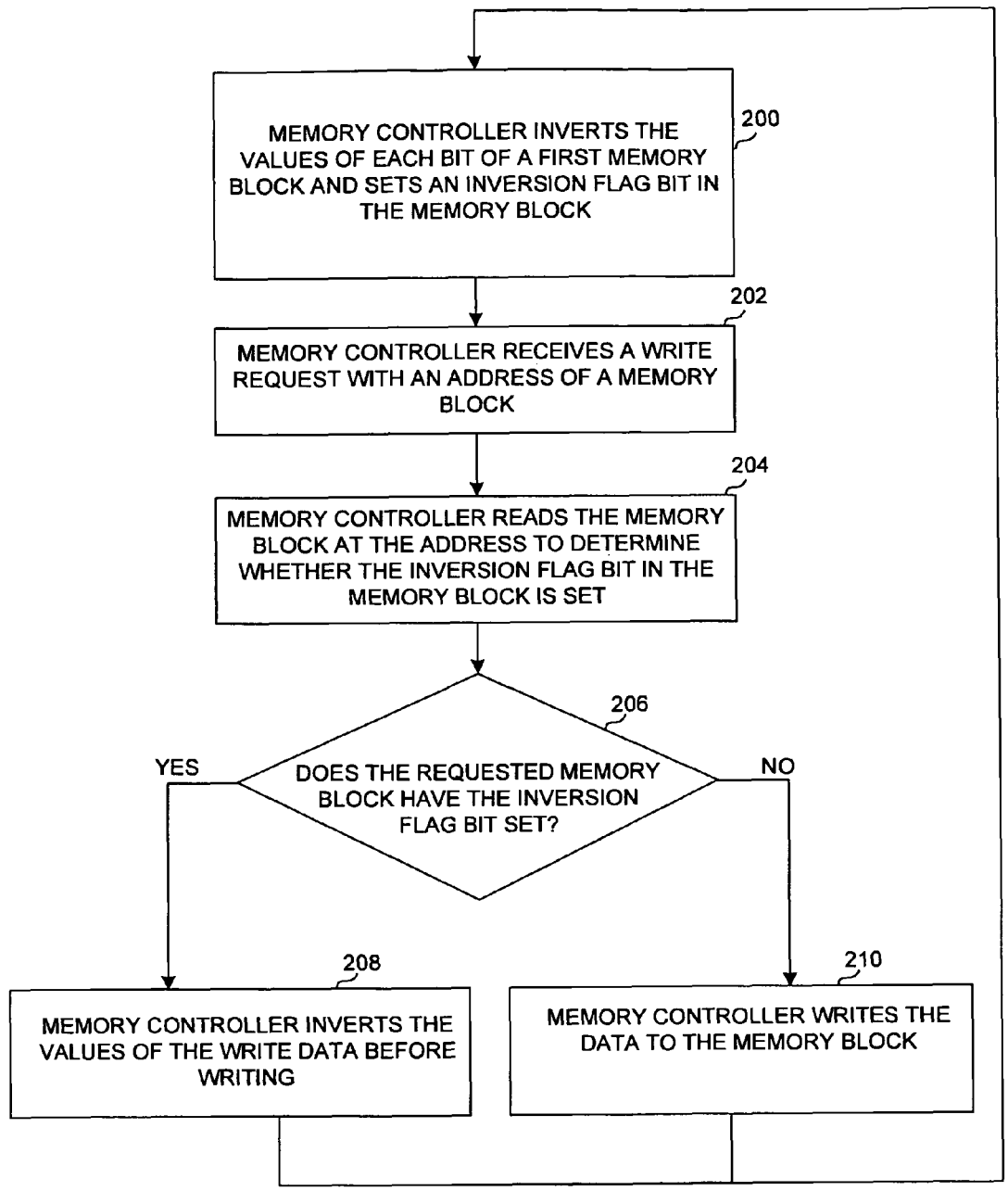
FIG. 9 is a flowchart of a method of responding to a write request while managing a memory containing inverted memory blocks in accordance with the first novel aspect.

FIG. 9 is a simplified flowchart of a novel method of performing a write operation in accordance with the first embodiment. Secure memory controller 18 may be in the midst of performing an inversion or reversion operation on a memory block in a first step (step 200). In a next step 202, secure memory controller 18 receives a write request to write an amount of data starting at a write address. In step 204, in response to this receiving of a write request, secure memory controller 18 reads the appropriate memory block 23 in order to get the digital logic value of the inversion flag bit 24 of the memory block. In step 206, secure memory controller 18 checks the value of the inversion flag bit 24. If the inversion flag bit 24 is a digital one value, then the associated memory block 23 contains inverted data and processing proceeds to step 208. If the inversion flag bit 24 is a digital zero value, then the associated memory block 23 contains true non-inverted digital logic values and processing proceeds to step 210. In step 208, secure memory controller 18 inverts the digital logic values of the received write data (data received from processor 15) before writing the data to the memory block 23. In step 210, on the other hand, secure memory controller 18 writes the received write data (data received from processor 15) without alteration to the memory block 23.

Figure 10:
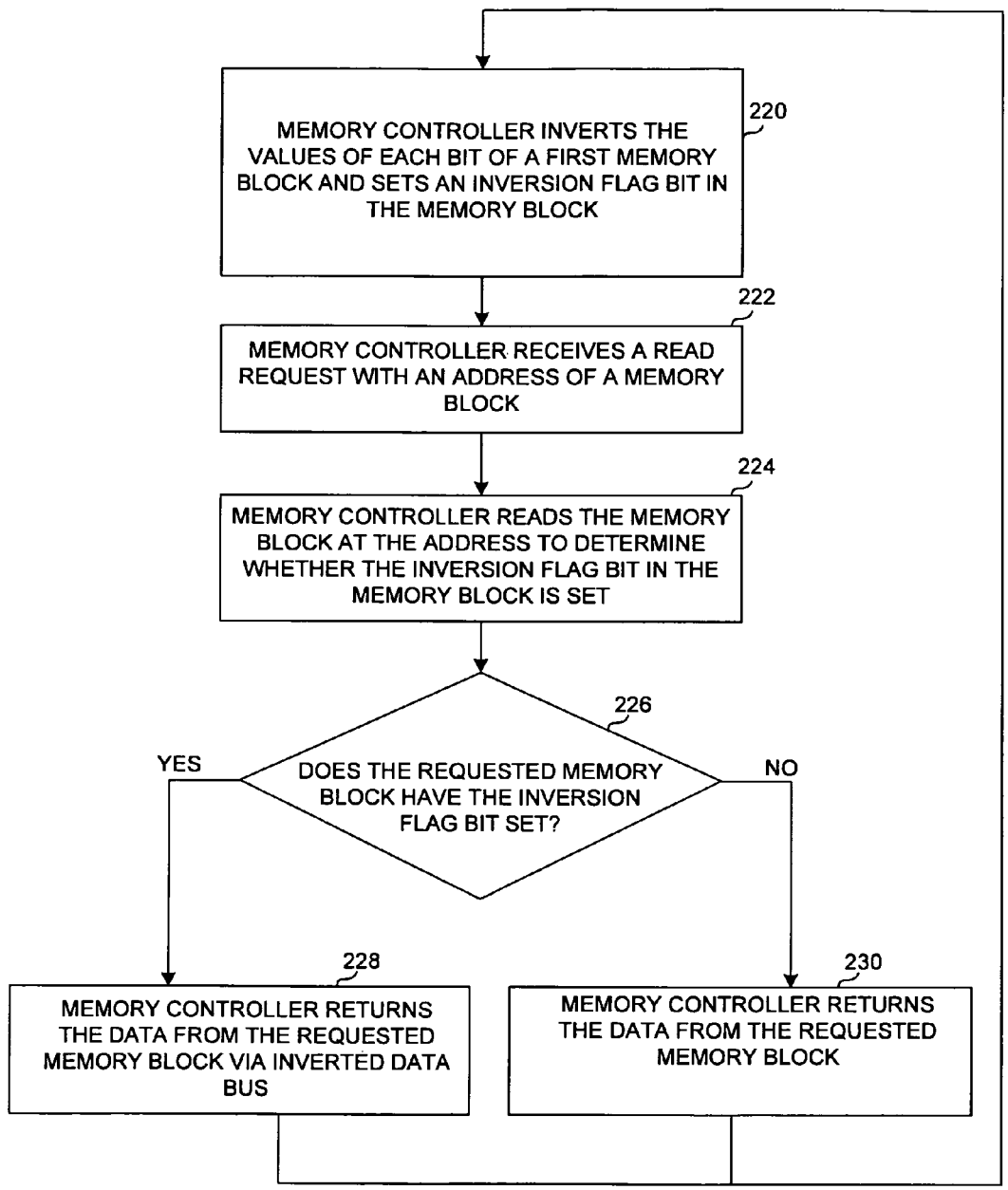
FIG. 10 is a flowchart of a method of responding to a read request while managing a memory containing inverted memory blocks in accordance with the first novel aspect.

FIG. 10 is a simplified flowchart of a novel method of performing a read operation in accordance with the first embodiment. Secure memory controller 18 may be in the midst of performing an inversion or reversion operation on a memory block 23 in a first step (step 220). In a next step 222, secure memory controller 18 receives a read request to read an amount of data starting at a read address. In step 224, in response to this receiving of a read request, secure memory controller 18 reads the appropriate memory block in order to get the thirty-one data bits and the digital logic value of the inversion flag bit 24 of the memory block. In step 226, secure memory controller 18 checks the value of the inversion flag bit 24. If the inversion flag bit 24 is a digital one value, then the memory block contains data bits with their digital logic values inverted; accordingly, secure memory controller 18 proceeds to step 228. If the inversion flag bit 24 is a digital zero value, then the memory block contains data bits with their true programmed, non-inverted digital logic values; accordingly, secure memory controller 18 proceeds to step 230. In step 228, secure memory controller 18 inverts the outgoing data before it is supplied back to the processor 15 via bus 32. If, on the other hand, processing proceeds to step 230, then secure memory controller 18 does not invert the outgoing data before supplying the data back to processor 15 via bus 32.

Figure 11:
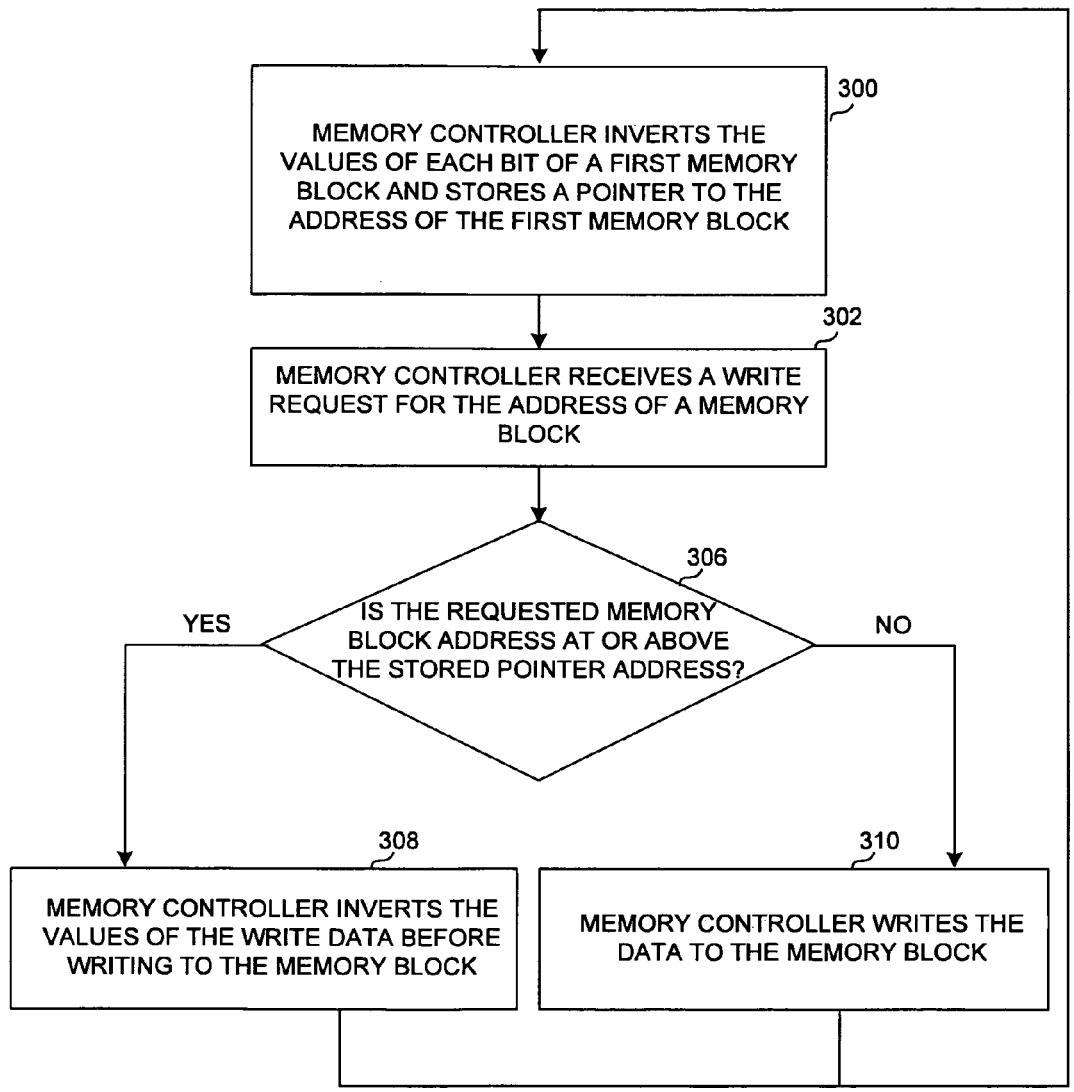
FIG. 11 is a flowchart of a method of responding to a write request while managing a memory containing inverted memory blocks in accordance with the second novel aspect.

FIG. 11 is a simplified flowchart of a novel method of performing a write operation in accordance with the second embodiment. Secure memory controller 18, in this example, is in the midst of performing an inversion operation on a memory block 23 in a first step (step 300). In a next step 302, secure memory controller 18 receives a write request to write an amount of data starting at a write address. In step 306, in response to this receiving of a write request, secure memory controller 18 checks the write address against the address referenced by the stored inversion flag pointer. If the inversion flag pointer 33 references an address higher than or equal to the write address, then memory block 23 that contains the write address location is deemed to contain inverted data; accordingly, secure memory controller 18 proceeds to step 308. If the inversion flag pointer 33 references an address lower than the write address, then memory block 23 that contains the write address location is deemed to contain non-inverted data; accordingly, secure memory controller 18 proceeds to step 310. If secure memory controller 18 proceeds to step 308, then secure memory controller 18 inverts the digital logic values of the received write data and writes them to the memory block 23 at the write address. If secure memory controller 18 proceeds to step 310, then secure memory controller 18 writes the received data without alteration to the memory block 23 at the write address.

Figure 12:
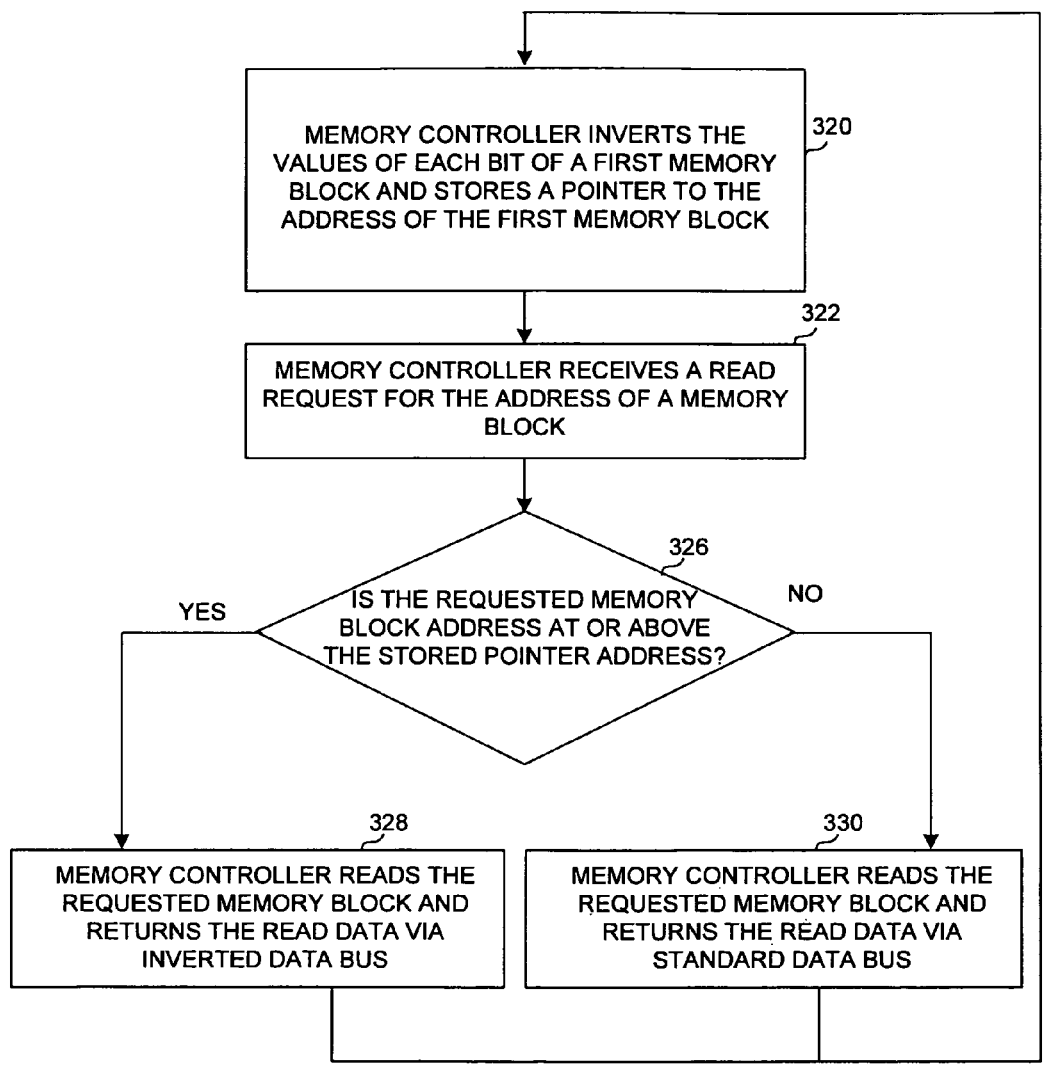
FIG. 12 is a flowchart of a method of responding to a read request while managing a memory containing inverted memory blocks in accordance with the second novel aspect.

FIG. 12 is a simplified flowchart of a novel method of performing a read operation in accordance with the second embodiment. Secure memory controller 18, in this example, is in the midst of performing an inversion operation on a memory block 23 in a first step (step 320). In a next step 322, secure memory controller 18 receives a read request to read an amount of data starting at a read address. In step 326, in response to this receiving of a read request, secure memory controller 18 checks the read address against the address referenced by the stored inversion flag pointer 33. If the inversion flag pointer 33 references an address higher than or equal to the read address, then memory block 23 that contains the read address location is deemed to contain inverted data; accordingly, secure memory controller 23 proceeds to step 328. If the inversion flag pointer 33 references an address lower than the write address, then memory block 23 that contains the read address location contains non-inverted data; accordingly, secure memory controller 18 proceeds to step 330. If secure memory controller proceeds to step 328, then secure memory controller 18 reads the data bits in the memory block 23 at the read address, inverts the outgoing data as it is supplied back to processor 15. If secure memory controller 18 proceeds to step 230, then secure memory controller 18 reads the data bits in the memory block 23 at the read address and returns to data to processor 15 without inversion.

Although certain specific embodiments are described above for instructional purposes, the teachings of this patent document have general applicability and are not limited to the specific embodiments described above. The novel bit-flipping mechanism described above is not limited to use in secure processors, but rather sees use in numerous other applications. In one application, a general purpose memory integrated circuit includes the novel bit-flipping mechanism. The general purpose memory is accessed by circuitry outside the integrated circuit in normal fashion in a larger system. The operations of the internal bit-flipping mechanism are entirely transparent to system circuitry that is accessing the general purpose memory integrated circuit. Accordingly, various modifications, adaptations, and combinations of various features of the described embodiments can be practiced without departing from the scope of the invention as set forth in the claims.

What is claimed is:
1. An integrated circuit comprising:
   a memory having a plurality of memory blocks, wherein each memory block has a set of bits, and wherein each bit has a value;

a secure memory controller that inverts and reverts the value of each bit of each memory block of the memory such that the amount of time each bit of the memory contains a digital logic one value is substantially equal to the amount of time the bit contains a digital logic zero value, wherein the secure memory controller uses an inversion flag bit to track whether a memory block contains bits with inverted values, and wherein the inversion flag bit is a bit of the memory block; and a tamper detect circuit that causes the memory to be erased if a tamper detect condition is detected.

2. The integrated circuit of claim 1, further comprising:
a processor; and
a set of processor-executable instructions stored on a processor-readable medium, wherein execution of the set of processor-executable instructions by the processor causes said inverting and reverting and said tracking of whether the memory block contains bits with inverted values.

3. The integrated circuit of claim 1, wherein the secure memory controller comprises:
an inverted data path, wherein a read request to the secure memory controller results in read data being returned via the inverted data path if the read request references a memory block containing bits with inverted values.

4. The integrated circuit of claim 1, wherein the memory is erased by a method taken from the group consisting of: writing a digital logic one value into each bit of each memory block of the first memory, writing a digital logic zero value into each bit of each memory block of the memory, writing random digital logic values into the bits of each memory block of the memory, and overwriting each memory block of the memory with information different from information stored in the memory block at the time the tamper detect condition is detected.

5. An integrated circuit comprising:
a memory having a plurality of memory blocks, wherein each memory block has a set of bits, wherein each bit has a value;
a secure memory controller that inverts and reverts the value of each bit of each memory block of the memory such that the amount of time each bit of the memory contains a digital logic one value is substantially equal to the amount of time the bit contains a digital logic zero value, wherein the secure memory controller uses an inversion tracking pointer to track whether a memory block contains bits with inverted values, wherein the inversion tracking pointer identifies a memory location in the memory; and
a tamper detect circuit that causes the memory to be erased if a tamper detect condition is detected.

6. The integrated circuit of claim 5, further comprising:
a processor; and
a set of processor-executable instructions stored on a processor-readable medium, wherein execution of the set of processor-executable instructions by the processor causes said inverting and reverting and said tracking of whether a memory block contains bits with inverted values.

7. The integrated circuit of claim 5, wherein the secure memory controller comprises:
an inverted data path, wherein a read request to the memory controller results in read data being returned via the inverted data path if the read request references a memory block containing bits with inverted values.

8. The integrated circuit of claim 5, wherein the memory is erased by a method taken from the group consisting of: writing a digital logic one value into each bit of each memory block of the first memory, writing a digital logic zero value into each bit of each memory block of the memory, writing random digital logic values into the bits of each memory block of the memory, and overwriting each memory block of the memory with information different from information stored in the memory block at the time the tamper detect condition is detected.

9. A method comprising:
(a) managing at least a portion of a memory such that each bit of the portion contains a digital logic one value an amount of time substantially equal to an amount of time that the bit contains a digital logic zero value, wherein the portion includes a plurality of memory blocks;
(b) tracking whether each memory block of the portion contains bits with inverted bit values, wherein the tracking involves using an inversion flag bit in a memory block to track whether the memory block contains bits with inverted bit values; and
(c) erasing the portion of memory if a tamper detect condition is detected.

10. The method of claim 9, further comprising:
(d) reading a memory block and thereby obtaining read data; and
(e) reverting the value of each bit of read data if the read memory block contains bits with inverted bit values.

11. The method of claim 9, wherein the steps (a) and (b) are performed by a secure memory controller.

12. The method of claim 9, wherein the steps (a) and (b) are performed by a processor.

13. The method of claim 9, wherein an inverted data path is used to manage the memory in step (a).

14. The method of claim 9, wherein the erasing of the portion of memory in step (c) is performed by writing to the memory in response to a signal received from a tamper detect circuit.

15. A method comprising:
(a) managing a memory such that each bit of the memory contains a digital logic one value an amount of time substantially equal to an amount of time that the bit contains a digital logic zero value, wherein the memory includes a plurality of memory blocks;
(b) tracking whether each memory block contains bits with inverted values, wherein said tracking involves storing a memory address pointer; and
(c) erasing the memory if a tamper detect condition is detected.

16. The method of claim 15, further comprising:
(d) reading a memory block and thereby obtaining read data; and
(e) reverting the value of each bit of read data if the read memory block contains bits with inverted values.

17. The method of claim 15, wherein the steps (a) and (b) are performed by a secure memory controller.

18. The method of claim 15, wherein the steps (a) and (b) are performed by a processor.

19. The method of claim 15, wherein an inverted data path is used to manage the memory in step (a).

20. An apparatus comprising:
a memory, having a plurality of memory blocks, wherein each memory block has a set of bits, wherein each bit has a value; and
means for cyclically inverting and reverting the value of each bit of each memory block of the memory, for tracking whether each memory block contains bits with inverted values, for responding to a read operation by reverting the value of each bit of read data if it is detected that a target memory block of the read operation contains bits with inverted values, for responding to a write operation by inverting the value of each bit of write data if it is detected that a target memory block of the write operation contains bits with inverted values, and for erasing the memory upon detection of a tamper detect condition.

21. The apparatus of claim 20, wherein the means is an integrated circuit, wherein tracking whether a memory block contains bits with inverted values references an inversion tag bit in the memory block.

22. The apparatus of claim 20, wherein the means is an integrated circuit, wherein tracking whether a memory block contains bits with inverted values references a memory address of a memory block of the first memory.

* * * * *